(12) United States Patent
Allen

(10) Patent No.: US 7,716,435 B1
(45) Date of Patent: May 11, 2010

(54) PROTECTION OF POINT-IN-TIME APPLICATION DATA USING SNAPSHOT COPIES OF A LOGICAL VOLUME

(75) Inventor: David J. Allen, Holliston, MA (US)

(73) Assignee: EMC Corporation, Hopkinton, MA (US)

(*) Notice: Subject to any disclaimer, the term of this patent is extended or adjusted under 35 U.S.C. 154(b) by 515 days.

(21) Appl. No.: 11/731,181

(22) Filed: Mar. 30, 2007

(51) Int. Cl.
*G06F 13/00* (2006.01)

(52) U.S. Cl. ........................... 711/162; 711/154

(58) Field of Classification Search ........... 711/154, 711/162
See application file for complete search history.

(56) References Cited

U.S. PATENT DOCUMENTS

| | | | |
|---|---|---|---|
| 5,206,939 A | 4/1993 | Yanai et al. | 395/400 |
| 5,778,394 A | 7/1998 | Galtzur et al. | 707/205 |
| 5,819,292 A | 10/1998 | Hitz et al. | 707/203 |
| 5,845,147 A | 12/1998 | Vishlitzky et al. | 395/825 |
| 5,857,208 A | 1/1999 | Ofek | 707/204 |
| 6,594,744 B1* | 7/2003 | Humlicek et al. | 711/162 |
| 6,862,632 B1 | 3/2005 | Halstead et al. | |
| 7,113,945 B1 | 9/2006 | Moreshet et al. | 707/8 |
| 7,516,286 B1* | 4/2009 | Dalai et al. | 711/162 |
| 2005/0182910 A1* | 8/2005 | Stager et al. | 711/162 |

OTHER PUBLICATIONS

Rick Weaver and Ron Haupert, "Implementing Snapshot Copy Using Technologies from BMC and EMC," EMC White paper, 2001, 36 pp.
"EMC Virtual LUN Technology: A Detailed Review," EMC White paper, Sep. 2006, 15 pp.
"Virtual LUNs: Applied Technology," EMC White paper, Oct. 2006, 12 pp.
Daren Bieniek, "The Essential Guide to Table Partitioning and Data Lifecycle Management," SQL Server Magazine, Mar. 2006, 6 pp.

* cited by examiner

*Primary Examiner*—Reba I Elmore
(74) *Attorney, Agent, or Firm*—Muirhead and Saturnelli, LLC

(57) ABSTRACT

Providing protection of point-in-time application data includes obtaining a plurality of original snapshot copies of an original logical volume containing the application data, causing the original snapshot copies to be tested for data corruption, and restoring data corresponding to one of the original snapshot copies. Application data is accessible by an application prior to completion of the restoration. One of the original snapshot copies may be restored to the original logical volume and/or to a new logical volume different from the original logical volume. Prior to completion of the restoration, particular data may be restored to the original logical volume or to the new logical volume prior to an operation to access the particular data. The original snapshot copies may be provided as virtual devices.

20 Claims, 13 Drawing Sheets

PROTECTION OF POINT-IN-TIME APPLICATION DATA USING SNAPSHOT COPIES OF A LOGICAL VOLUME

BACKGROUND OF THE INVENTION

1. Technical Field

This application relates to storage devices, and more particularly to the field of protecting data stored in storage devices.

2. Description of Related Art

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

It is possible for a logical volume containing application data to become corrupted, either through faulty operation of the application itself or from another source (e.g., improper operation of an unrelated application running on the same host that accesses the same volume). When the data is corrupted, it may be desirable to restore the data to a prior, uncorrupted, state. In systems where periodic backups are performed, the logical volume may be restored from the most recent backup. However, if the time between backups is relatively long, then the prospect of losing a significant amount of data may be unacceptable. For example, if backups are performed daily for a system that handles financial transactions, then restoring a logical volume using backup data means that up to a day's worth of financial transactions may be lost.

One solution to this problem could be to perform backups more regularly. However, many types of backups require copying all the data for a logical volume. Thus, there is a tradeoff between the amount of storage space needed for backup data and the frequency of backups. Moreover, restoring a logical volume from backup data may require taking an application that uses the logical volume off-line while the restoration is occurring, which may not be practical.

Accordingly, it is desirable to provide a system in which the granularity (frequency) of backups may be increased without significantly increasing the need for backup storage while also allowing for applications to operate and modify data during the restoration process.

SUMMARY OF THE INVENTION

According to the present invention, providing protection of point-in-time application data includes obtaining a plurality of original snapshot copies of an original logical volume containing the application data, causing the original snapshot copies to be tested for data corruption, and restoring data corresponding to one of the original snapshot copies, wherein application data is accessible by an application prior to completion of the restoration. One of the original snapshot copies may be restored to the original logical volume. Prior to completion of the restoration, particular data may be restored to the original logical volume prior to an operation to access the particular data. One of the original snapshot copies may be restored to a new logical volume different from the original logical volume. Prior to completion of the restoration, particular data may be restored to the new logical volume prior to an operation to access the particular data. The original snapshot copies may be provided as virtual devices. Causing the original snapshot copies to be tested may include cloning at least one of the original snapshot copies to provide a duplicate snapshot copy and then causing an application to examine the duplicate snapshot copy. The duplicate snapshot copy may be used for restoring data. One of the original snapshot copies may be used for restoring data. Testing may include examining duplicates of each of the original snapshot copies to find a most recent snapshot that does not correspond to corrupt data.

According further to the present invention, computer software, in a computer readable medium, provides protection of point-in-time application data. The software includes executable code that obtains a plurality of original snapshot copies of an original logical volume containing the application data, executable code that causes the original snapshot copies to be tested for data corruption, and executable code that restores data corresponding to one of the original snapshot copies, wherein application data is accessible by an application prior to completion of the restoration. The one of the original snapshot copies may be restored to the original logical volume. The computer software may also include executable code that restores particular data to the original logical volume prior to an operation to access the particular data and prior to completion of the restoration. The one of the original snapshot copies may be restored to a new logical volume different from the original logical volume. The computer software may include executable code that restores particular data to the new logical volume prior to an operation to access the particular data and prior to completion of the restoration. The original snapshot copies may be provided as virtual devices. Executable code that causes the original snapshot copies to be tested may include executable code that duplicates at least one of the original snapshot copies to provide a duplicate snapshot copy and may include executable code that causes an application to examine the duplicate snapshot copy. The duplicate snapshot copy may be used for restoring data. One of the original snapshot copies may be used for restoring data. Executable code that tests the original snapshot copies may include executable code that examines duplicates of each of the original snapshot copies to find a most recent snapshot that does not correspond to corrupt data.

DETAILED DESCRIPTION OF VARIOUS EMBODIMENTS

Figure 1:
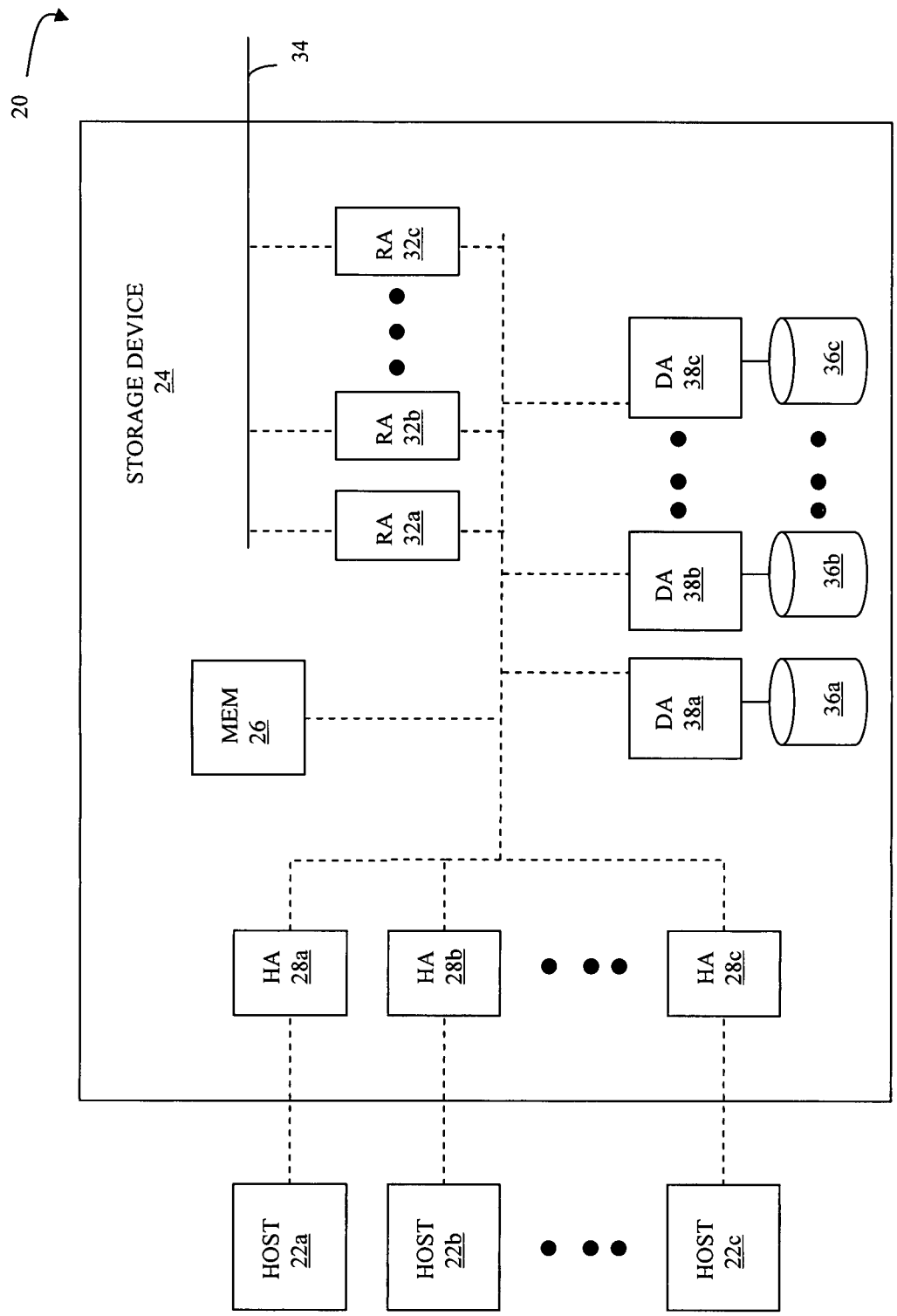
FIG. 1 is a diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the actual correspondence between the logical devices and the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks or requests that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
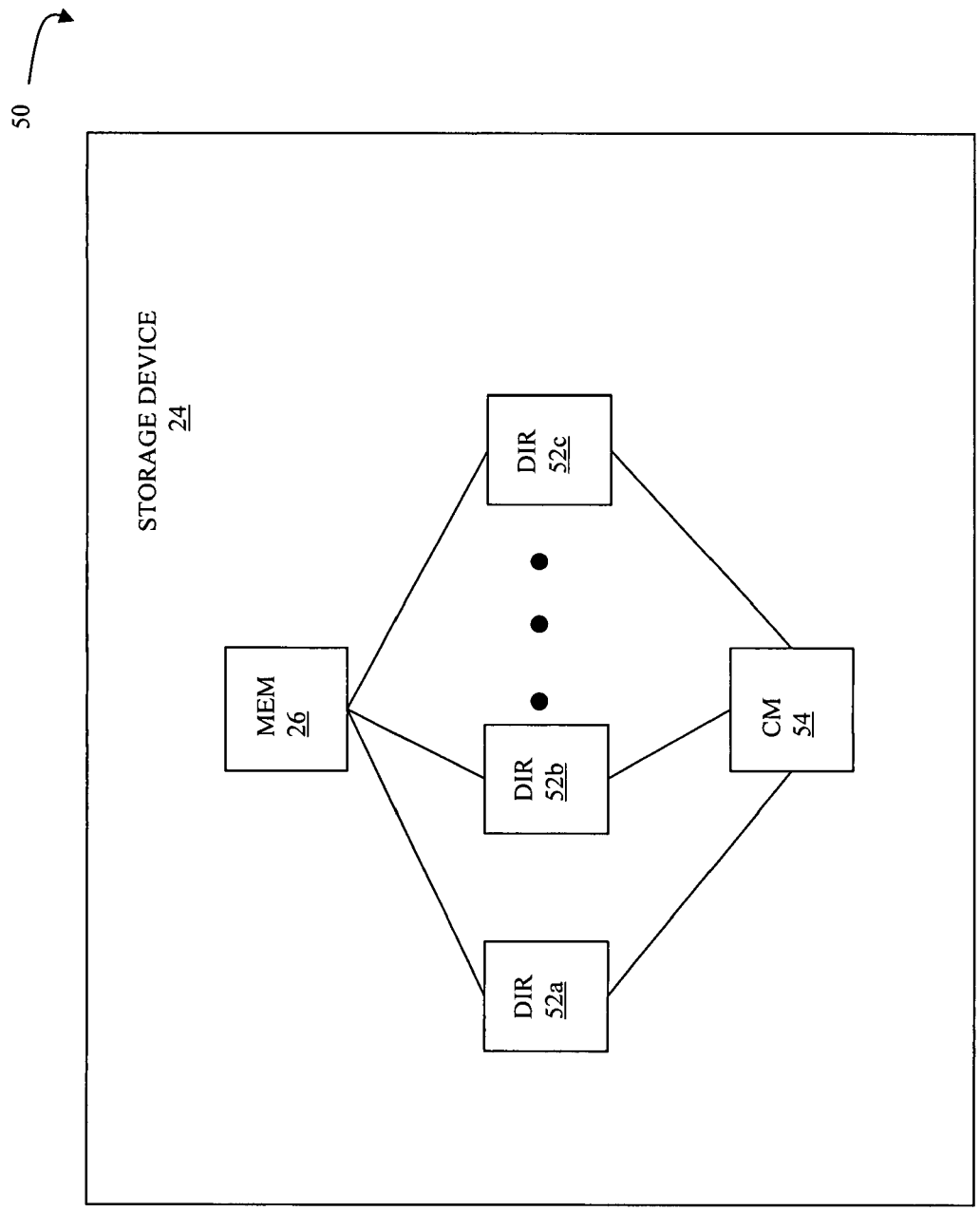
FIG. 2 is a diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixtyfour directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at one types of director and perform other processing with the other processing system. This is described in more detain elsewhere herein.

Figure 3:
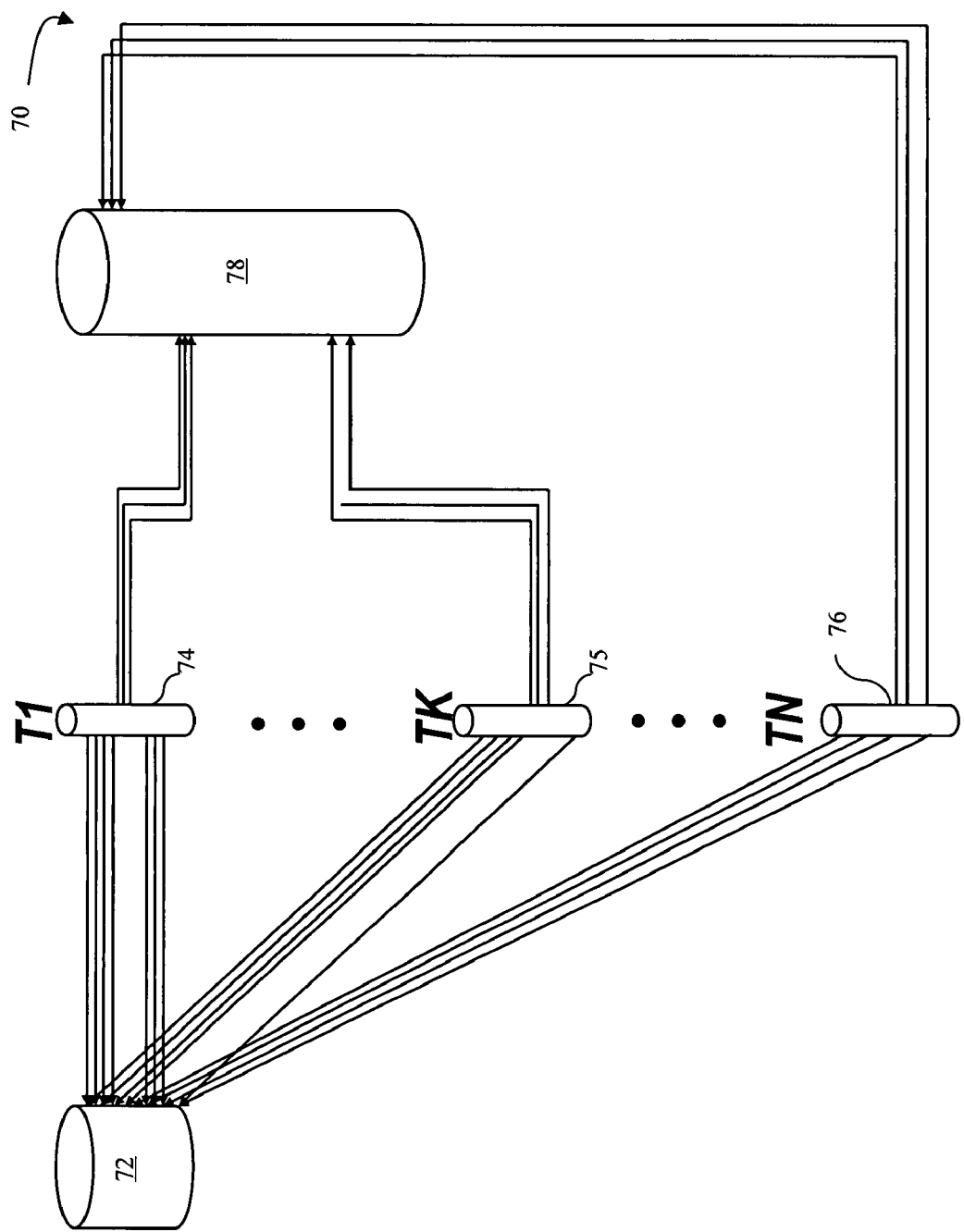
FIG. 3 is a diagram showing a standard logical device, a log device, and a plurality of snapshots according to the system described herein.

Referring to FIG. 3, a standard logical device 72 may be one of a plurality of logical devices established within the storage device 24 and accessed by application(s) running in one or more of the hosts 22a-22c coupled thereto. Generally, the system described herein may be used with any type of computing/communication device accessing the standard logical device, but for ease of illustration, the system may be described in connection with the one or more of the hosts 22a-22c accessing application data on the standard logical device 72. Application data on the standard logical device 72 may become corrupted (either by the application(s) or some other entity), in which case it may be desirable to restore the standard logical device 72 to a state just prior to when the corruption occurred.

A plurality of snapshot copies 74-76 (snapshots) of the standard logical device 72 may be obtained at different points in time, T1, TK, ... TN. The time between obtaining successive snapshots may be any appropriate amount, such as fifteen minutes. Longer times between snapshot copies decreases the granularity of protection, but also reduces the overhead for obtaining and maintaining the snapshots 74-76. Conversely, a shorter time between the copies increases granularity, but also increases overhead.

The snapshots 74-76 may be provided using any appropriate snapshot technology. In an embodiment herein, the snapshots are virtual storage devices as described in U.S. Pat. No. 7,113,945 to Moreshet, et al., which is incorporated by reference herein. A virtual storage device is a logical device constructed as a table of entries, where each entry is a pointer that points to a quantum of data, such as a track. Initially, a virtual storage device is established and initially activated with all of the pointers pointing to tracks of the standard logical device for which the snapshot is being created. Subsequently, when data is written to a track of the standard logical device that has not changed since the virtual device was established, the track is first copied to an allocated track of a log device (essentially a pool of free tracks), the entry in the virtual device table is made to point to the log track, and then the write to the standard logical device proceeds. In this way, the virtual device provides a point in time copy of the standard logical device without necessarily having to copy all of the data of the standard logical device. At any time after establishing the virtual device, it is possible to read the virtual device to determine data that was stored on the standard logical device at the time that the virtual device was established, even if the data had been subsequently overwritten by writes to the standard logical device.

FIG. 3 shows the virtual devices 74-76 with a subset of pointers pointing to the standard logical device 72 and another subset of pointers pointing to a log device 78. Each of the virtual devices 74-76 represents a point-in-time snapshot of the standard logical device 72. The system described herein periodically obtains and saves a snapshot of the standard logical device 72. If the standard logical device 72 becomes corrupted (e.g., if an application detects that application data stored on the standard logical device 72 is corrupted), then the application is halted. The system duplicates various ones of the snapshots 72-74 and then causes the duplicates to be tested until a latest uncorrupted version is found. The duplicate snapshot is used to restore the data to the standard logical device or to a different standard logical device while, at the same time, the application is restarted and provided access to data.

Figure 4:
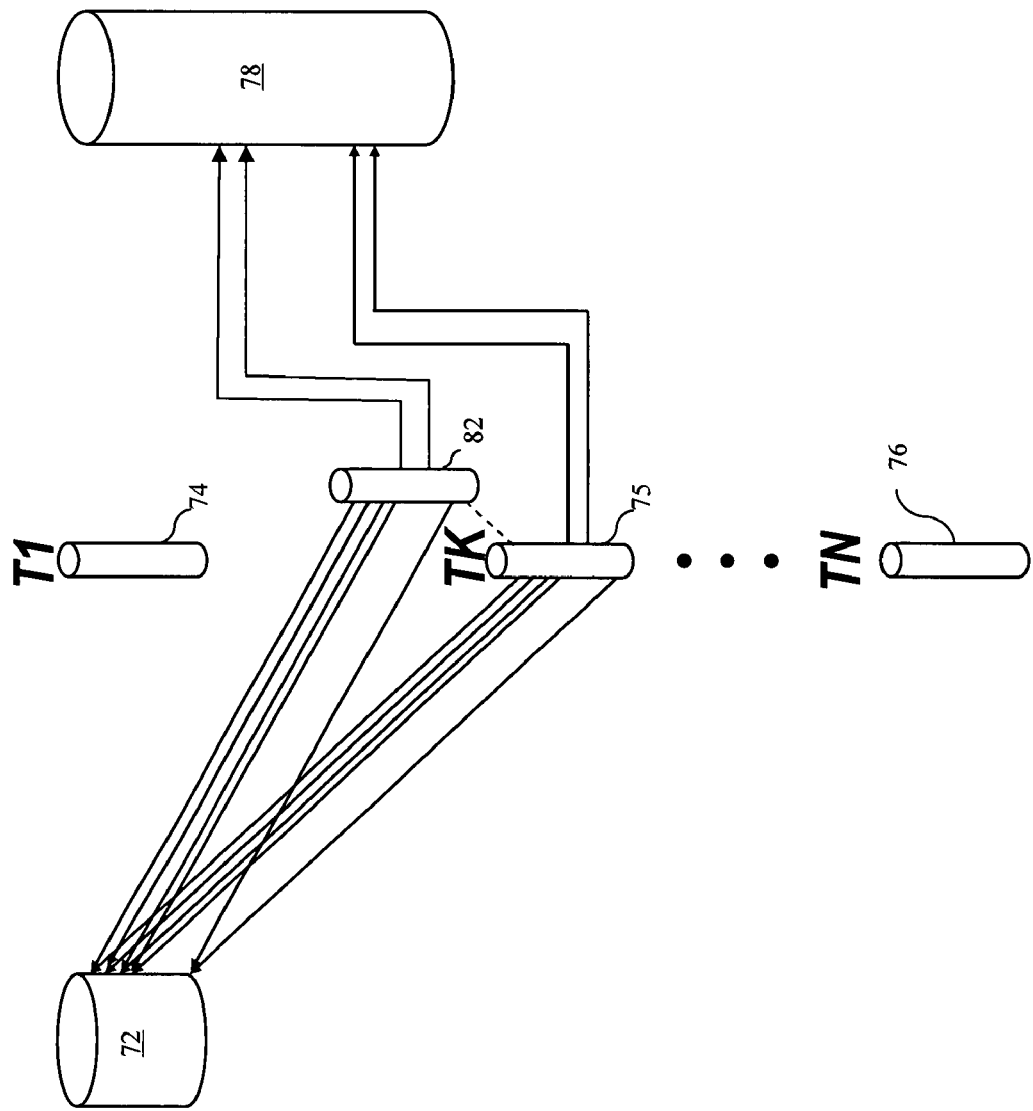
FIG. 4 is a diagram showing a standard logical device, a log device, a plurality of snapshots, and a duplicate snapshot according to the system described herein.

Referring to FIG. 4, the original snapshot 75 representing the state of the standard logical device 72 at a time TK is duplicated to provide a duplicate snapshot 82. Constructing the duplicate snapshot 82 is described in more detail elsewhere herein. The duplicate snapshot 82 also represents a state of the data of the standard logical device 72 at a time TK. The duplicate snapshot 82 points to the same tracks of the standard logical device 72 as the original snapshot 75, but points to different tracks of the log device 78 than the original snapshot 75. However, when the duplicate snapshot 82 is created, the data on the tracks of the log device 78 for any particular track pointed to by the duplicate snapshot 82 is the same as the corresponding data on the log track pointed to by the original snapshot 75. This is described in more detail elsewhere herein.

Figure 5A:
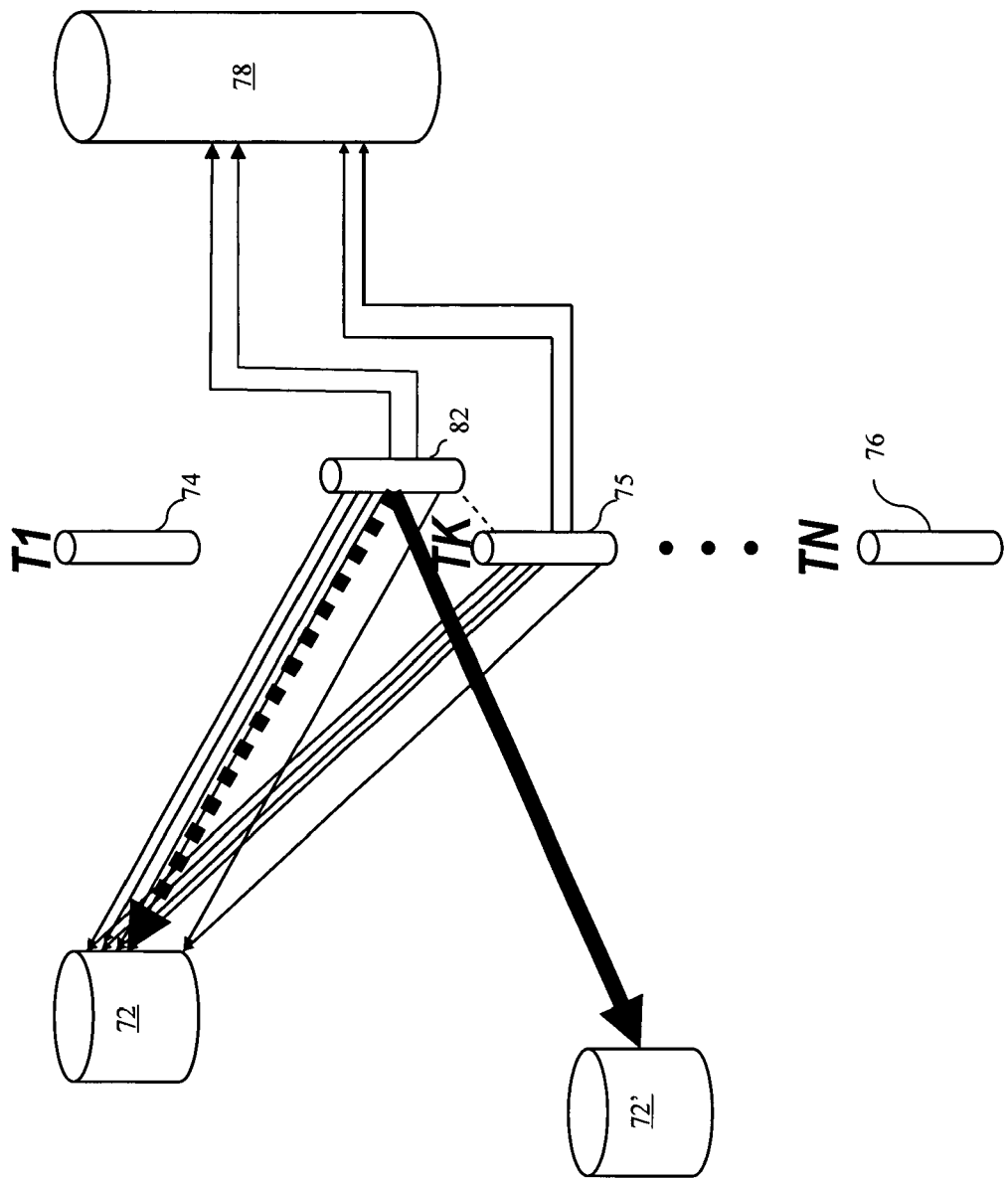
FIG. 5A is a diagram illustrating restoring a duplicate snapshot to a standard logical device according to the system described herein.
Figure 5B:
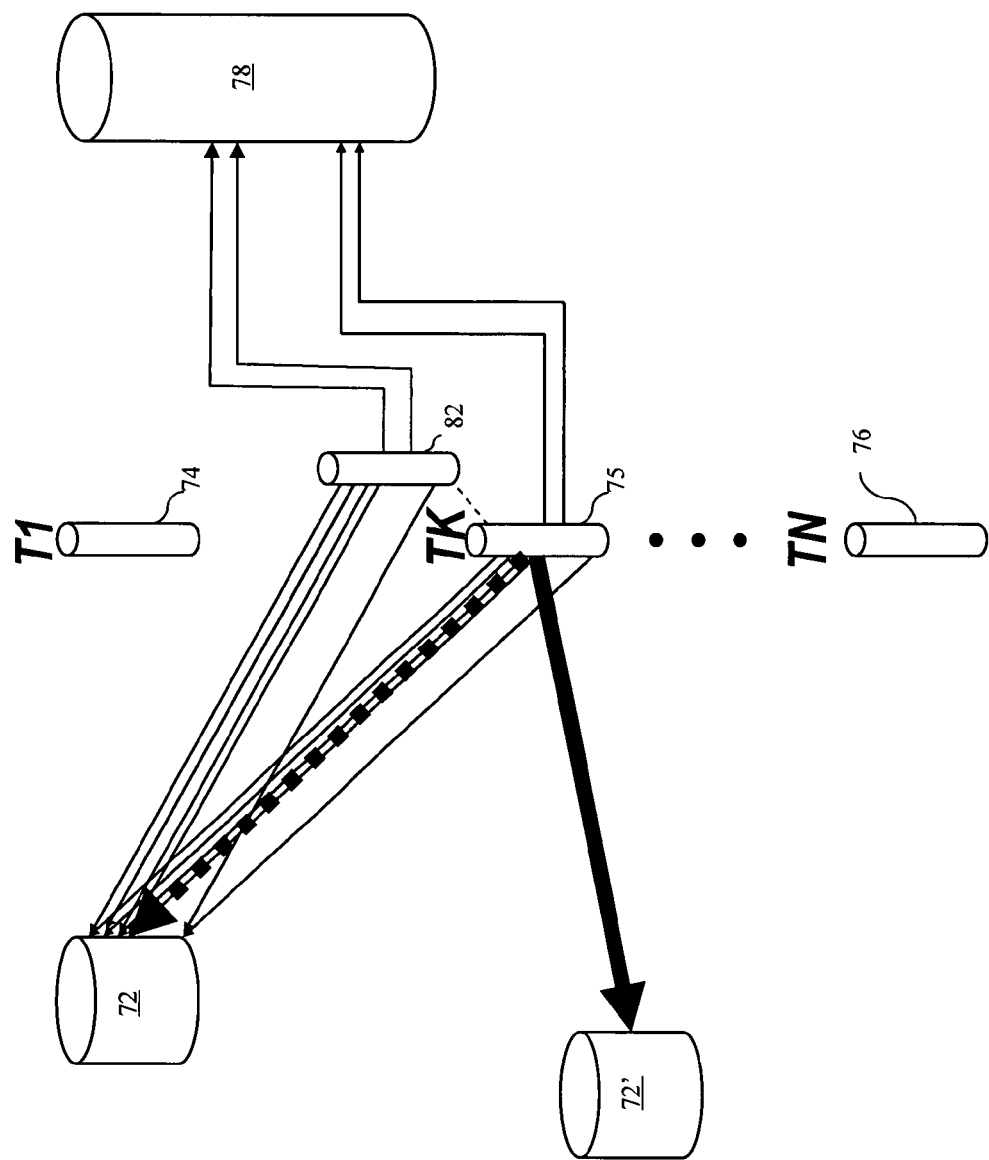
FIG. 5B is a diagram illustrating restoring one of a plurality of original snapshots to a standard logical device according to the system described herein.

Referring to FIGS. 5A and 5B, a new standard logical device 72' is shown as being populated according to data of the duplicate snapshot 82. The duplicate snapshot 82 is restored to the standard logical device 72'. As described in more detail elsewhere herein, once a particular snapshot is chosen for restoration to the standard logical device 72, the particular snapshot may be used to restore the data either to the standard logical device 72 (illustrated by dotted line) or to the new standard logical device 72'. In some embodiments, the duplicate snapshot 82 may be used by the application for testing, but the corresponding original snapshot 75 may be used for the restoration, which is illustrated in FIG. 5B. Accordingly, for the discussion herein, reference to restoration of a duplicate snapshot to a standard logical device (FIG. 5A) should be understood to also include the alternative of restoration of the original snapshot (FIG. 5B).

Figure 6:
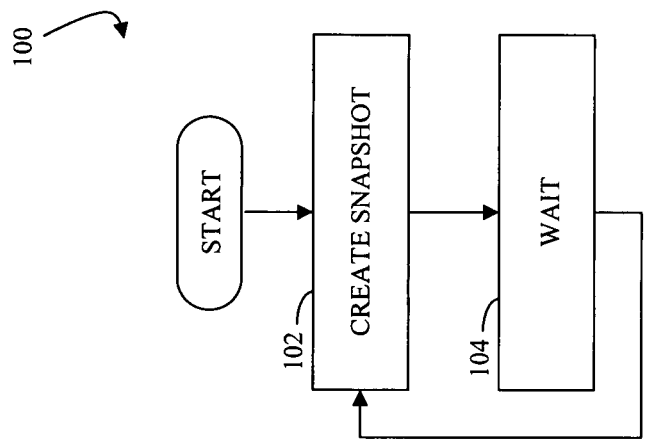
FIG. 6 is a flow chart illustrating steps performed in connection with periodically creating snapshots according to the system described herein.

Referring to FIG. 6, a flow chart 100 illustrates steps performed in connection with periodically obtaining snapshots of the standard logical device 72. Processing begins at a first step 102 where the snapshot copy is obtained. As discussed elsewhere herein, any appropriate snapshot technology may be used, including that described in U.S. Pat. No. 7,113,945, where a virtual device representing a point-in-time copy of the standard logical device 72 is established and activated. Other technologies include that described in U.S. Pat. No. 5,819,292 to Hitz, et al., which is incorporated by reference herein. It may be useful to use a snapshot technology that requires relatively little storage space. For example, the virtual device technology described in U.S. Pat. No. 7,113,945 initially constructs a table of entries that point to tracks of the standard logical device and then requires more storage space only for data that is modified after establishing and activating the virtual device.

Following the step 102 is a step 104 where the system waits. Essentially, the step 104 provides a delay between iterations. As discussed elsewhere herein, the amount of delay that is desired is a function of the granularity (frequency) that is desired balanced by the overhead associated with obtaining and maintaining snapshots. Note also that the snapshots may only need to be maintained until a scheduled regular backup is performed. For example, if regular backups are performed, daily, then snapshots that are obtained following a regular backup may be discarded after a subsequent regular backup so that the system never maintains more than a day's worth of snapshots. In an embodiment herein, snapshots may be obtained every one and one half hours in a system in which daily backups are performed, but of course both of these frequencies may be adjusted. Following the step 104, control transfers back to the step 102 for a new iteration.

Figure 7:
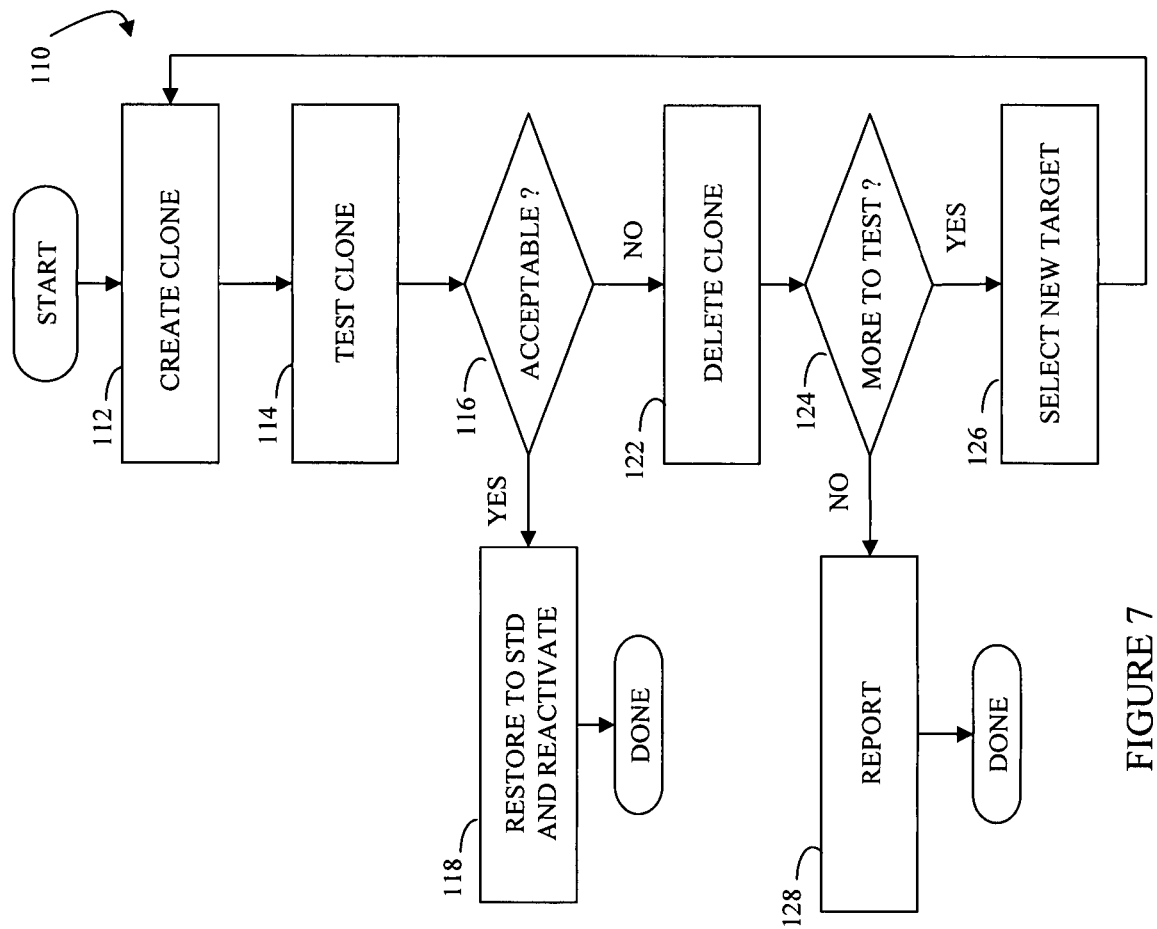
FIG. 7 is a flow chart illustrating steps performed in connection with testing each of a plurality of snapshots according to the system described herein.

Referring to FIG. 7, a flow chart 110 illustrates steps performed when it is discovered that data for a logical volume (logical device) has been corrupted and it is desirable to restore the logical device to a state that existed prior to the corruption using the periodic snapshots. Choosing a particular snapshot may be performed by the application that uses the data or by an auxiliary application that handles testing the data. The tests are application specific. For example, a financial application may test whether certain amounts or groups of amounts balance and/or add up to an expected value. Any appropriate tests may be used and actual tests are not described herein. Generally, for the system described herein, it is sufficient to understand that there may be criteria for deeming data provided on a logical volume as corrupt or not.

Processing begins at a first step 112 where a duplicate snapshot of a target snapshot (snapshot being examined) is created. Creating a duplicate snapshot of a target snapshot is described in more detail elsewhere herein. Selection of an initial target snapshot may be by any appropriate criteria, such as starting with the most recent snapshot or by starting with the latest snapshot that is prior to snapshots known to correspond to corrupted data. Any other appropriate criteria may be used to select an initial target snapshot.

Following the step 112 is a step 114 where the duplicate snapshot is tested to determine if the data corresponding thereto is corrupt. As discussed elsewhere herein, the test depends upon the application(s) having corrupted data and/or criteria used to deem data as corrupted or not. Note that the test at the step 114 may be destructive of the data (e.g., may overwrite legitimate data that otherwise needs to be preserved). However, the tests performed at the step 114 are performed using the duplicate snapshot and, as discussed in more detail elsewhere herein, do not affect data associated with the original snapshot and do not affect data of the standard logical device or other snapshots.

Note also that the step 114 may represent causing the test to be performed (e.g., by an application that uses the data) and/or may represent inspecting already existing or causing to be created test data, log data, register dump data, or some other type of data indicative of the integrity of data corresponding to the duplicate snapshot. The step 114 may represent providing data to an application which performs appropriate testing. Accordingly, for the discussion herein, testing or causing to be tested shall be understood to include any of these as well as anything that may ascertain (directly or by some other means) the integrity of the data corresponding to the duplicate snapshot.

Following the step 114 is a test step 116 where it is determined if the data associated with the target snapshot is acceptable (not corrupted). If so, then control transfers from the step 116 to a step 118 where the data is restored to the logical device 72 (or, as discussed elsewhere herein, to a different logical device 72') and the application is reactivated to access the one of the logical devices 72, 72' to which the data is being restored. Data may be restored from the target snapshot or from the duplicate snapshot and an application may actively access data on the logical device (including writing new data) while the restoration is taking place. This is described in more detail elsewhere herein. Following the step 118, processing is complete.

If it is determined at the test step 116 that data associated with the snapshot being tested is not acceptable (is corrupt), then processing transfers from the step 118 to a step 122 where the duplicate snapshot is deleted. Deleting the duplicate snapshot at the step 122 is described in more detail elsewhere herein. Following the step 122 is a test step 124 where it is determined if there are more target snapshots to test. If so, then control transfers from the step 124 to a step 126 where a new target snapshot is selected. In an embodiment herein, selecting the new target snapshot at the step 126 includes selecting a next oldest snapshot, but any appropriate criteria may be used for selecting a new target snapshot at the step 126. Following the step 126, control transfers back to the step 112, discussed above, to begin a new iteration.

If it is determined at the test step 124 that there are no more snapshots to test, then control transfers from the test step 124 to a step 128 where the user may be provided with a report indicating that all available snapshots correspond to corrupt data. Of course, any other appropriate processing (e.g., some type of error processing) may be performed at the step 128. Following the step 128, processing is complete.

Figure 8:
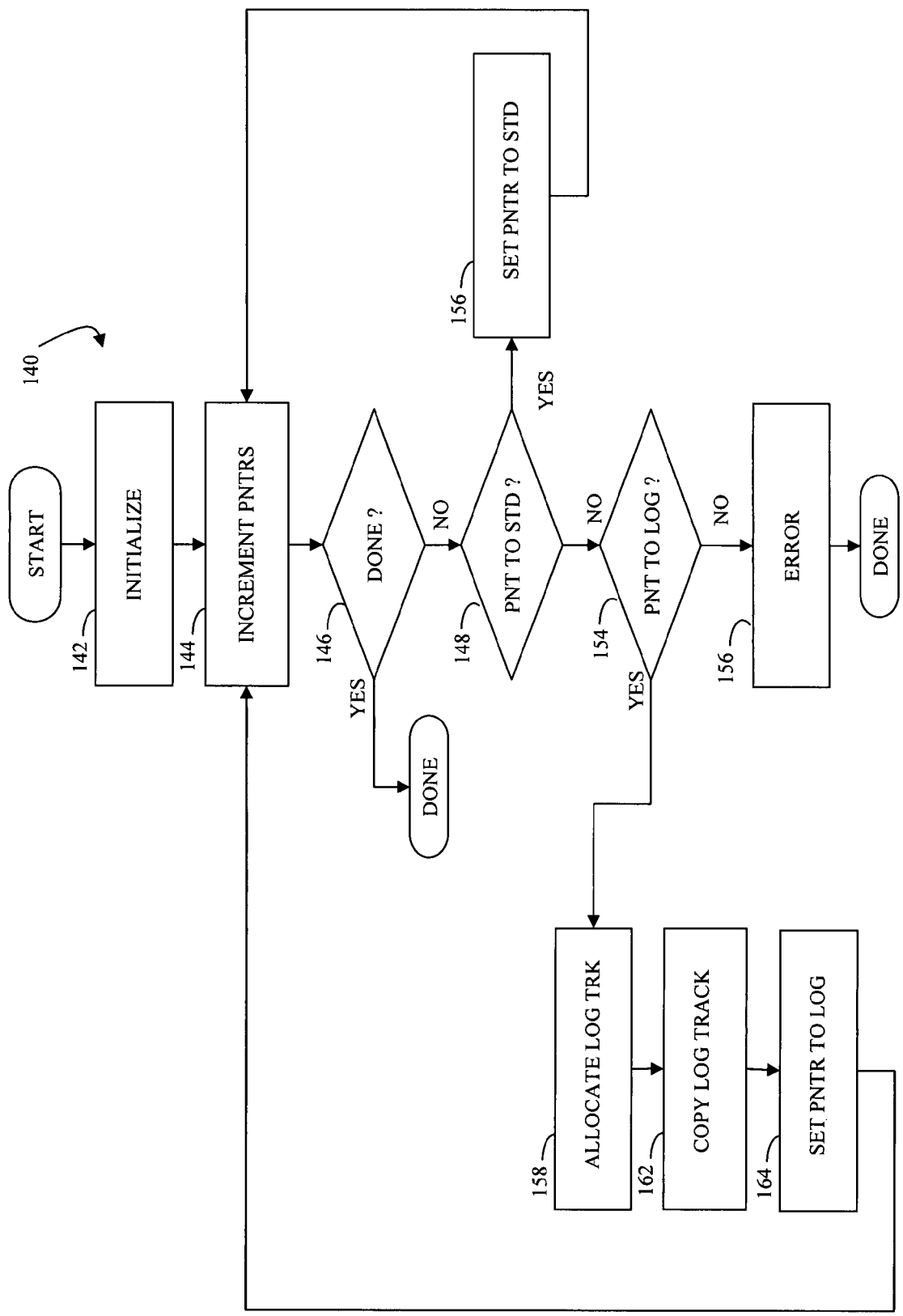
FIG. 8 is a flow chart illustrating steps performed in connection with creating a duplicate snapshot according to the system described herein.

Referring to FIG. 8, a flow chart 140 illustrates steps performed in connection with cloning a snapshot at the step 112. Processing begins at a first step 142 where initialization is performed. The initialization provided at the step 142 depends upon the technology used for snapshots, and may include allocating appropriate data structures for the duplicate snapshot and may include populating data fields. The initialization performed at the step 142 may also include initializing pointers used to traverse the target snapshot table entries as well as the duplicate snapshot table entries that all point to standard logical device tracks or log device tracks.

Following the step 142 is a step 144 where the pointers used to increment through the table entries are incremented. Following the step 144 is a test step 146 where it is determined if all of the table entries have been processed. If so, then processing is complete. Otherwise, control transfers from the test step 146 to a step 148 where it is determined if the table entry of the target snapshot currently being processed points to a track of the standard logical device 72. If so, then control transfers to a step 156 where the corresponding entry in the duplicate snapshot is set to point to the track of the standard logical device 72. Following the step 156, control transfers back to the step 144, discussed above, for a next iteration.

If it is determined at the test step 148 that the table entry of the target snapshot currently being processed does not point to a track of the standard logical device 72, then control transfers from the step 148 to a test step 154 where it is determined if the table entry of the target snapshot currently being processed points to a track of the log device 78. If not, then control transfers from the step 154 to a step 156 where error processing is performed. Note that every table entry of a virtual device should point to either a track of the standard logical device 72 or a track of the log device 78. Following the step 156, processing is complete.

If it is determined at the test step 154 that the table entry of the target snapshot currently being processed points to a track of the log device 78, then control transfers from the step 154 to a step 158 where a new log track is allocated (e.g., from a pool of available log tracks). Following the step 158 is a step 162 where the data of the log track pointed to by the target snapshot is copied to the new log track. Following the step 162 is a step 164 where the corresponding table entry of the duplicate snapshot is set to point to the new log track. Following the step 164, control transfers back to the step 144, discussed above, to begin a new iteration.

Figure 9:
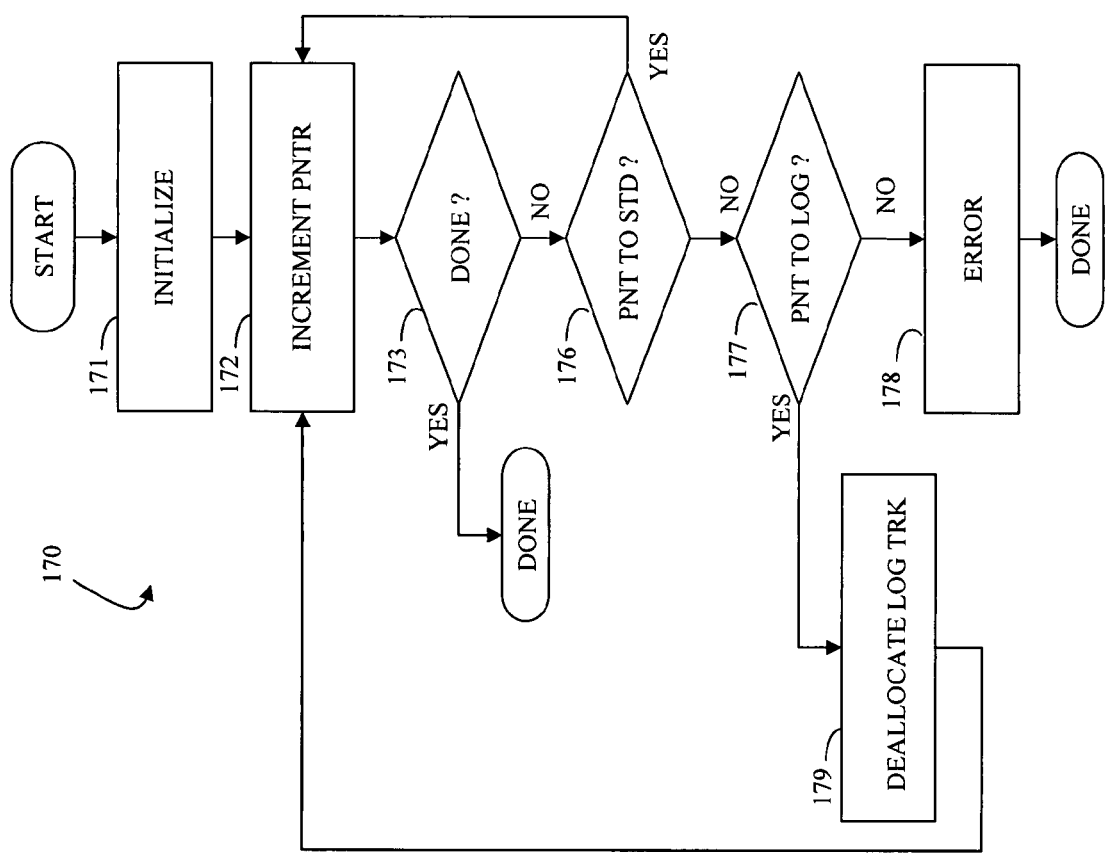
FIG. 9 is a flow chart illustrating steps performed in connection with deleting a duplicate snapshot according to the system described herein.

Referring to FIG. 9, a flow chart 170 illustrates steps performed in connection with the step 122 in the flow chart 110, discussed above, where a duplicate snapshot is deleted. Processing begins at a first step 171 where initialization is performed. The initialization provided at the step 171 depends upon the technology used for snapshots, and may include, for example, marking appropriate data structures for deallocation once the other deletion steps are complete. The initialization performed at the step 171 may also include initializing a pointer used to traverse through the snapshot table entries of the snapshot being deleted.

Following the step 171 is a step 172 where the pointer used to increment through the table entries is incremented. Following the step 172 is a test step 173 where it is determined if all of the table entries have been processed. If so, then processing is complete. Note that other processing may be performed at this stage, including deallocating any remaining data for the snapshot being deleted. If it is determined at the test step 173 that all of the table entries have not been processed, then Control transfers from the test step 173 to a step 176 where it is determined if the table entry of the target snapshot currently being processed points to a track of the standard logical device 72. If so, then control transfers from the step 176 back to the step 172, discussed above, for a next iteration.

If it is determined at the step 176 that the table entry of the target snapshot currently being processed does not point to a track of the standard logical device 72, then control transfers from the step 176 to a test step 177 where it is determined if the table entry of the target snapshot currently being processed points to a track of the log device 78. If not, then control transfers from the step 177 to a step 178 where error processing is performed. Note that every table entry of a virtual device should point to either a track of the standard logical device 72 or a track of the log device 78. Following the step 178, processing is complete.

If it is determined at the test step 177 that the table entry of the target snapshot currently being processed points to a track of the log device 78, then control transfers from the step 177 to a step 179 where the log track is deallocated (e.g., returned to a pool of available log tracks). Following the step 179, control transfers back to the step 172, discussed above, for a next iteration.

As discussed elsewhere herein, the duplicate snapshot may be used for testing to determine if the duplicate snapshot corresponds to data that has not yet been corrupted. Such testing may include reading and writing data. As discussed elsewhere herein, it may be useful to provide a system where testing using a snapshot does not destroy any data stored on the standard logical device 72 and does not destroy data corresponding to any other snapshots. It is also worth noting that, for some applications, restoration is a step in the recovery process. For example, a database application may restore data to a particular state and then perform further processing (e.g., processing transaction log data) as a further recovery step. In some cases, this further processing may be destructive of the data, which makes the system described herein especially useful.

Figure 10:
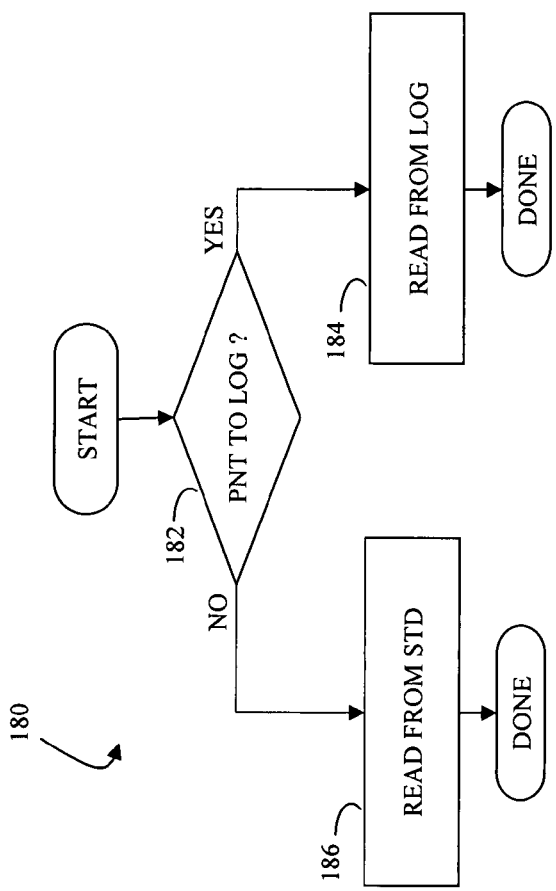
FIG. 10 is a flow chart illustrating steps performed in connection with reading from a snapshot according to the system described herein.

Referring to FIG. 10, a flow chart 180 illustrates steps performed in connection with reading data from a snapshot. Processing begins at a test step 182 where it is determined if a table entry corresponding to the track being read points to a track of the log device. If so, then control transfers from the step 182 to a step 184 where the data is read from the log device 78. Otherwise, control transfers from the step 182 to a step 186 where the data is read from the standard logical device 72. Following either the step 184 or the step 186, processing is complete.

Figure 11:
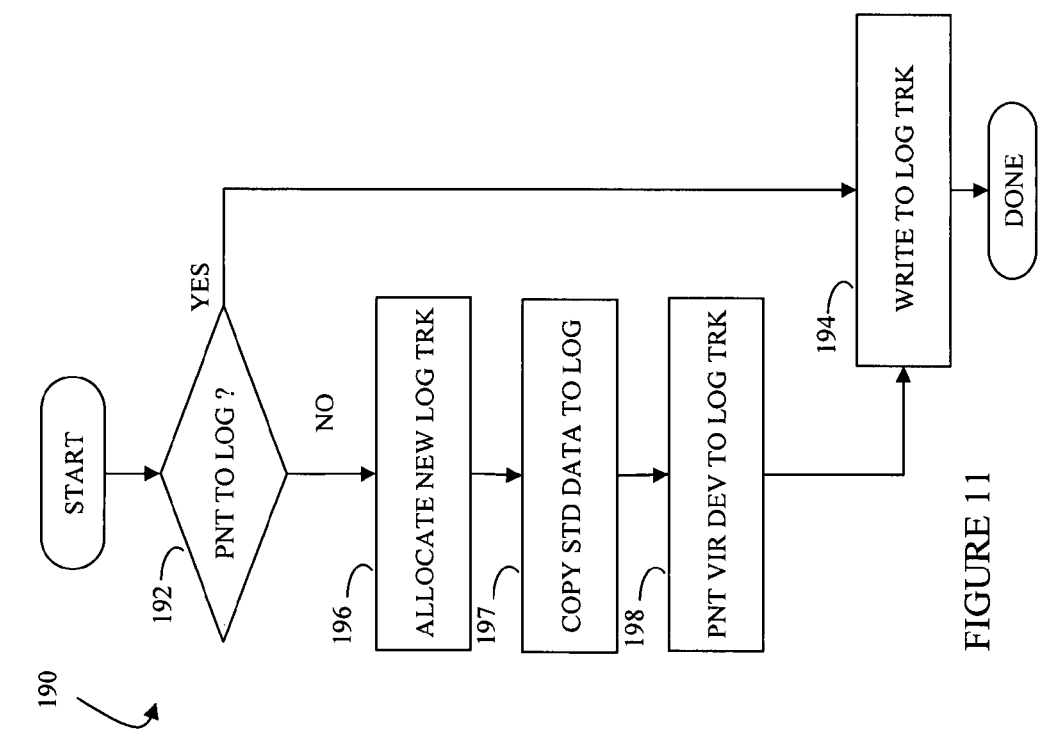
FIG. 11 is a flow chart illustrating steps performed in connection with writing data to a snapshot according to the system described herein.

Referring to FIG. 11, a flow chart 190 illustrates steps performed in connection with writing data to a snapshot device in a way that does not adversely affect data stored on the standard logical device 72 or any other snapshots. Processing begins at a first test step 192 where it is determined if the corresponding table entry points to the log device 78. If so, then control transfers from the step 192 to a step 194 where the data is written to the log track. Note that, as discussed above, a duplicate snapshot points to tracks of the log device 78 that are not shared (pointed to) by any other devices. In such a case, overwriting the tracks of the log device 78 at the step 194 does not affect the standard logical device 72 or any other snapshots. Following the step 194, processing is complete.

If it is determined at the step 194 that the entry in the table for the snapshot does not point to the log device (i.e., points to a track of the standard logical device), then control transfers from the step 192 to a step 196 where a new track is allocated on the log device 78. Following the step 196 is a step 197 where data is copied from the track of the standard logical device 72 to the newly allocated track of the log device 78. Following the step 197 is a step 198 where the table entry of the virtual device (snapshot) is made to point to the newly allocated track of the log device 78. Following the step 198 is the step 194, described above, where the data is written. Following the step 194, processing is complete.

Figure 12:
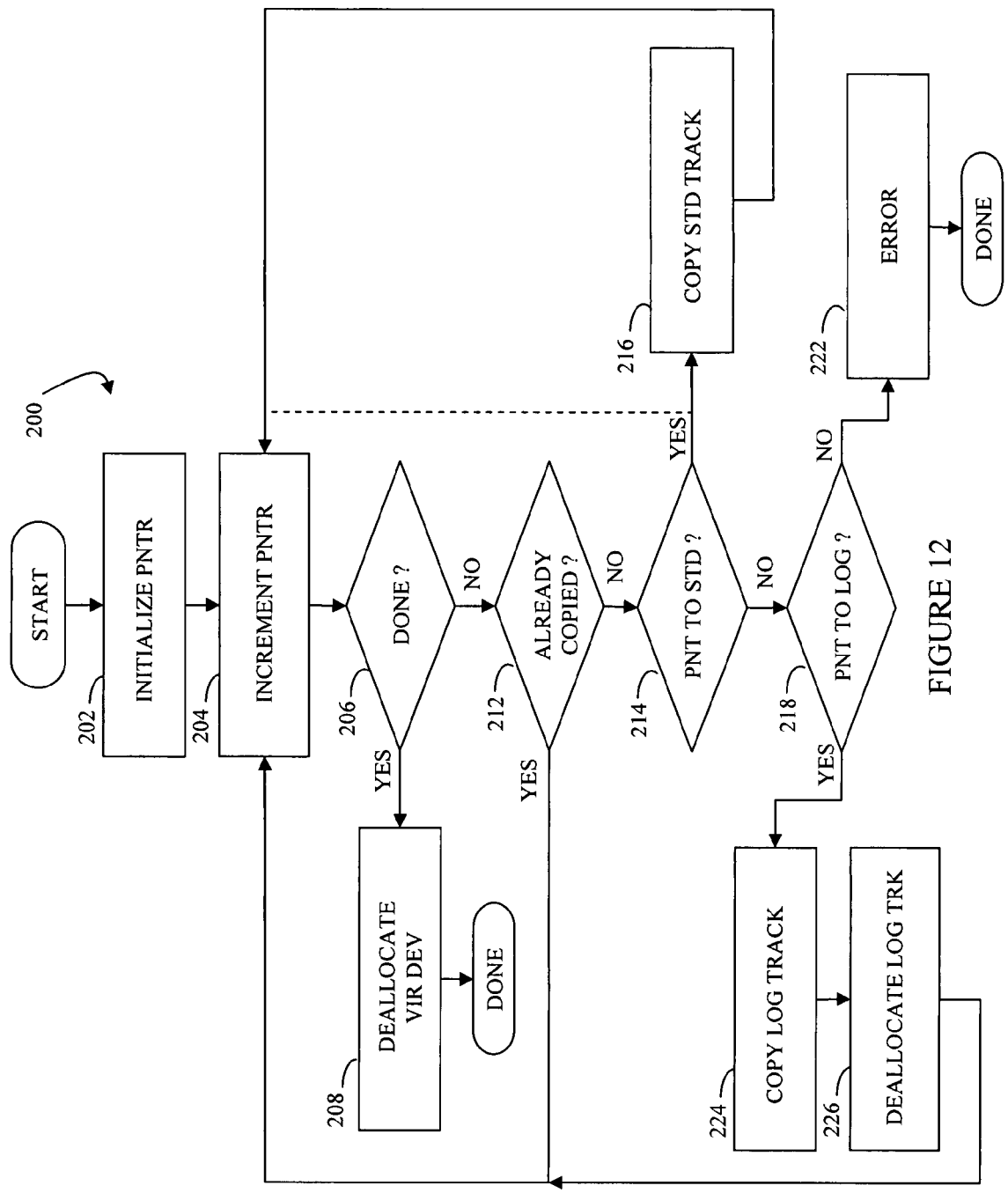
FIG. 12 is a flow chart illustrating steps performed in connection with restoring a snapshot to a standard logical device according to the system described herein.

Referring to FIG. 12, a flow chart 200 illustrates steps performed in connection with restoring a snapshot to a standard logical device. Processing begins at a first step 202 where initialization is performed. The initialization provided at the step 202 depends upon the technology used for snapshots, and may include initializing a table pointer used to traverse the table entries (pointers to the standard logical device or the log device) of the snapshot being restored.

Following the step 202 is a step 204 where the pointer used to traverse the table entries is incremented. Following the step 204 is a test step 206 where it is determined if all of the table entries have been processed. If so, then control transfers from the step 206 to a step 208 where any data elements used by the snapshot being restored are deallocated. Following the step 206, processing is complete. If it is determined at the step 206 that all of the table entries have not been processed, then control transfers from the test step 206 to a step 212 where it is determined if the data corresponding to the table pointer has already been restored. As discussed in more detail elsewhere herein, it is possible for data to be restored at any time in connection with the data of the standard logical device being accessed. Thus, although the table pointer iterates through the table entries sequentially, it is possible that some of the data has already been restored by a process other than that illustrated by the flow chart 200.

If it is determined at the test step 212 that corresponding data has already been restored, then control transfers from the step 212 back to the step 204, discussed above, for another iteration. Otherwise, control transfers from the step 212 to a step 214 where it is determined if the table entry of the snapshot being restored points to a track of the standard logical device 72. If so, then control transfers from the step 214 to a step 216 where the data is copied from the track of the standard logical device 72 to a corresponding track of the standard logical device 72'. Following the step 216, control transfers back to the step 204, discussed above, for another iteration. Note that, as discussed elsewhere herein, it is possible to restore a snapshot back to the standard logical device 72 (instead of the new standard logical device 72'), in which case the step 216 would not be necessary. This is illustrated by the alternative path from the step 214 to the step 204.

If it is determined at the step 214 that the table entry of the snapshot being restored does not point to a track of the standard logical device 72, then control transfers from the step 214 to a test step 218 where it is determined if the table entry of the snapshot being restored points to a track of the log device 78. If not, then control transfers from the step 218 to a step 222 where error processing is performed. Note that every table entry of a virtual device should point to either a track of the standard logical device 72 or a track of the log device 78. Following the step 222, processing is complete.

If it is determined at the test step 218 that the table entry of the snapshot being restored points to a track of the log device 78, then control transfers from the step 218 to a step 224 where the data of the log track pointed to by the snapshot being restored is copied to the standard logical device. Following the step 224 is a step 226 where the log track is deallocated (i.e., returned to a pool of available log tracks). Following the step 226, control transfers back to the step 204, discussed above, to begin a new iteration.

As discussed elsewhere herein, once a decision is made to restore a particular target snapshot or duplicate snapshot, the application may be restarted immediately and may access data on the standard logical device even though the restoration has not yet been completed. Data accesses that occur during the restoration process are handled in a special way, as described in more detail below.

Figure 13:
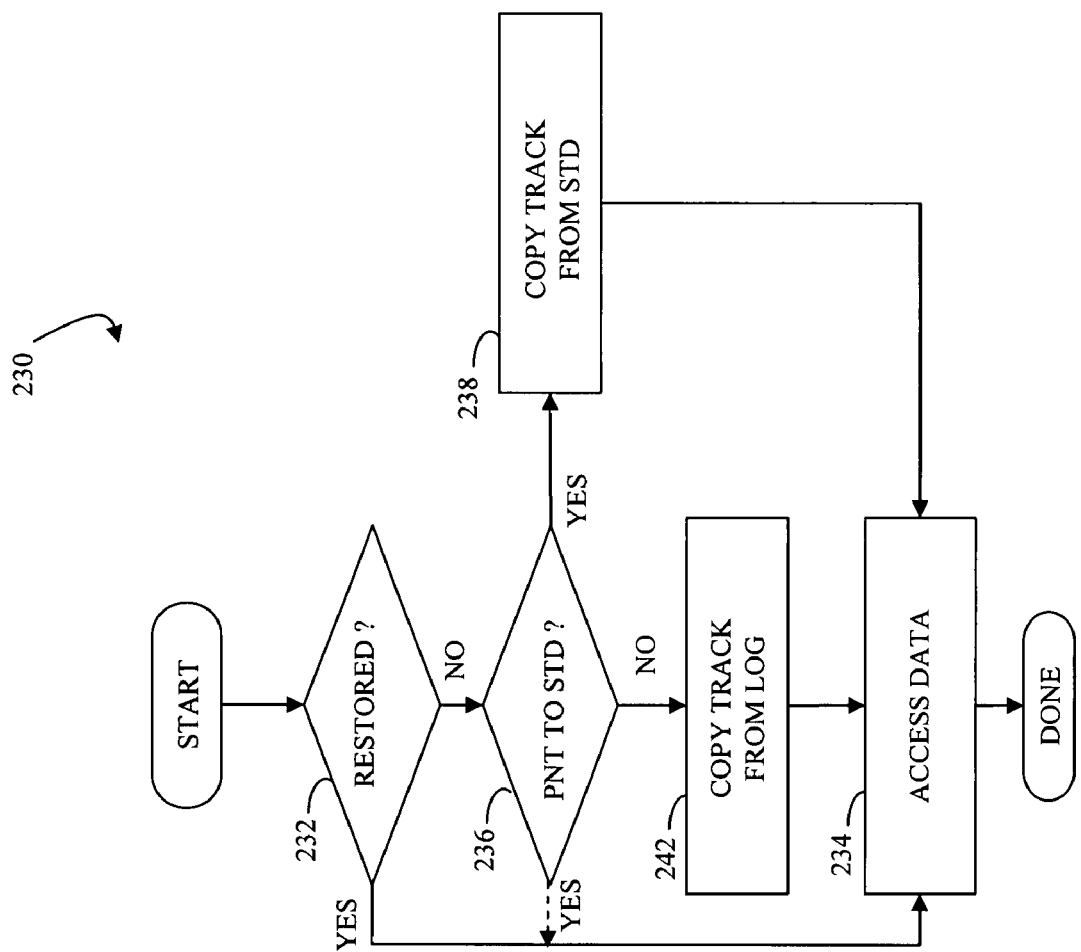
FIG. 13 is a flow chart illustrating steps performed in connection with accessing a standard logical device while restoring a snapshot to the standard logical device according to the system described herein.

Referring to FIG. 13, a flow chart 230 illustrates steps performed in connection with accessing data from a standard logical device to while a snapshot is being restored. Processing begins at a test step 232 where it is determined if the data has already been restored to the track of the standard logical device being accessed. Any appropriate mechanism may be used to identify which tracks have already been restored to the standard logical device, including setting a value in a table indicating which tracks have been restored. If it is determined at the test step 232 that the track being accessed has already been restored, then control transfers from the step 232 to a step 234 where the data is accessed on the standard logical device in a usual fashion. Following the step 234, processing is complete.

If it is determined at the test step 232 that the track being accessed has not already been restored, then control transfers from the step 232 to a test step 236 where it is determined if a table entry corresponding to the track of the standard logical device being accessed points to a track of the standard logical device. If so, then control transfers from the step 236 to a step 238 where the track is copied from the standard logical device 72 to the standard logical device 72'. Following the step 238 is the step 234, discussed above, where the data is accessed. Note that it is possible to restore a snapshot back to the standard logical device 72, in which case the step 238 would not be necessary. This is indicated by an alternative path from the test step 236 to the step 234.

If it is determined at the step 236 that a table entry corresponding to the track of the standard logical device being accessed points to a track of the log device 78, then control transfers from the step 236 to a step 242 where the track is copied from the standard logical device 72 to the log device 78. Following the step 242 is the step 234, discussed above, where the data is accessed. Following the step 234, processing is complete.

Figure 14:
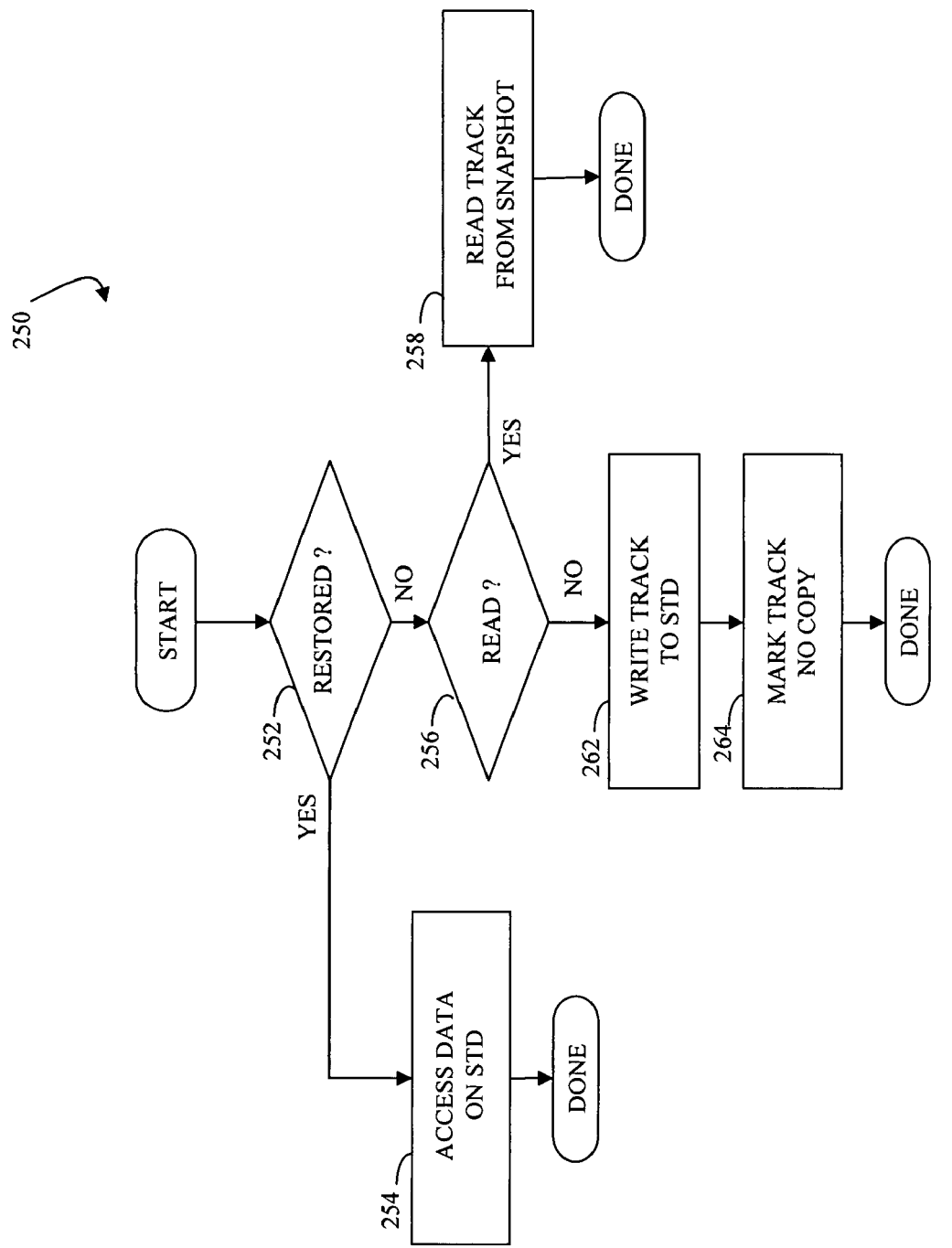
FIG. 14 is a flow chart illustrating steps performed in connection with accessing a standard logical device while restoring a snapshot to the standard logical device according to an alternative embodiment of the system described herein.

Referring to FIG. 14, a flow chart 250 illustrates steps performed in connection with an alternative embodiment for accessing data from a standard logical device to while a snapshot is being restored. Processing begins at a test step 252 where it is determined if the data has already been restored to the track of the standard logical device being accessed. Any appropriate mechanism may be used to identify which tracks have already been restored to the standard logical device, including setting a value in a table indicating which tracks have been restored. If it is determined at the test step 252 that the track being accessed has already been restored, then control transfers from the step 252 to a step 254 where the data is accessed on the standard logical device in a usual fashion. Following the step 254, processing is complete.

If it is determined at the test step 252 that the track being accessed has not already been restored, then control transfers from the step 252 to a test step 256 where it is determined if a read operation is being performed. If so, then control transfers from the step 256 to a step 258 where the track, which has not yet been restored, is read from the snapshot. Following the step 258, processing is complete.

If it is determined at the step 256 that the operation is not a read (i.e., is a write operation), then control transfers from the step 256 to a step 262 where the track is written to the standard logical device. In the system described herein, it may be assumed that a track's worth of data is written each time, but of course the system may be adjusted for other amounts of data. Following the step 262 is a step 264 where the track on the snapshot is marked (in some appropriate fashion) so as not to be restored to the standard logical device. Since the newest data has been written to the standard logical device, it would not be appropriate to overwrite this data with older data from the snapshot. Following the step 264, processing is complete.

Some of the processing/functionality described herein may be provided using Virtual LUN technology provided by EMC Corporation of Hopkinton, Mass. Although the system described herein uses tracks as a unit of data for certain purposes, it should be understood that other units of data (including, possibly, variable length units of data) may be used. This also applies to other data structures and data units. In addition, in some instances, the order of steps in the flow charts may be modified, where appropriate. The system described herein may be implemented using software provided in a computer-readable storage medium. The computer-readable storage medium may be located on at least one of the directors 52a-52c and/or on some other processor or group of processors provided in connection with the storage device 24.

While the invention has been disclosed in connection with various embodiments, modifications thereon will be readily apparent to those skilled in the art. Accordingly, the spirit and scope of the invention is set forth in the following claims.

What is claimed is:

1. A method of providing protection of point-in-time application data, comprising:
   obtaining a plurality of original snapshot copies of an original logical volume containing the application data;
   causing the original snapshot copies to be tested for data corruption; and
   restoring data corresponding to one of the original snapshot copies, wherein application data is accessible by an application prior to completion of the restoration.

2. A method, according to claim 1, wherein the one of the original snapshot copies is restored to the original logical volume.

3. A method, according to claim 2, wherein, prior to completion of the restoration, particular data is restored to the original logical volume prior to an operation to access the particular data.

4. A method, according to claim 1, wherein the one of the original snapshot copies is restored to a new logical volume different from the original logical volume.

5. A method, according to claim 4, wherein, prior to completion of the restoration, particular data is restored to the new logical volume prior to an operation to access the particular data.

6. A method, according to claim 1, wherein the original snapshot copies are provided as virtual devices.

7. A method, according to claim 1, wherein causing the original snapshot copies to be tested includes cloning at least one of the original snapshot copies to provide a duplicate snapshot copy and then having an application examine the duplicate snapshot copy.

8. A method, according to claim 7, wherein the duplicate snapshot copy is used for restoring data.

9. A method, according to claim 7, wherein one of the original snapshot copies is used for restoring data.

10. A method, according to claim 1, wherein testing includes examining duplicates of each of the original snapshot copies to find a most recent snapshot that does not correspond to corrupt data.

11. A computer readable storage medium storing software that provides protection of point-in-time application data, the software comprising:

executable code that obtains a plurality of original snapshot copies of an original logical volume containing the application data; and executable code that causes the original snapshot copies to be tested for data corruption;

executable code that restores data corresponding to one of the original snapshot copies, wherein application data is accessible by an application prior to completion of the restoration.

12. The computer readable storage medium, according to claim 11, wherein the one of the original snapshot copies is restored to the original logical volume.

13. The computer readable storage medium, according to claim 12, further comprising:

executable code that restores particular data to the original logical volume prior to an operation to access the particular data and prior to completion of the restoration.

14. The computer readable storage medium, according to claim 11, wherein the one of the original snapshot copies is restored to a new logical volume different from the original logical volume.

15. The computer readable storage medium, according to claim 14, further comprising:

executable code that restores particular data to the new logical volume prior to an operation to access the particular data and prior to completion of the restoration.

16. The computer readable storage medium, according to claim 11, wherein the original snapshot copies are provided as virtual devices.

17. The computer readable storage medium, according to claim 11, wherein executable code that causes the original snapshot copies to be tested includes executable code that duplicates at least one of the original snapshot copies to provide a duplicate snapshot copy and includes executable code that causes an application to examine the duplicate snapshot copy.

18. The computer readable storage medium, according to claim 17, wherein the duplicate snapshot copy is used for restoring data.

19. The computer readable storage medium, according to claim 17, wherein one of the original snapshot copies is used for restoring data.

20. The computer readable storage medium, according to claim 11, wherein executable code that tests the original snapshot copies includes executable code that examines duplicates of each of the original snapshot copies to find a most recent snapshot that does not correspond to corrupt data.

* * * * *